Feb. 24, 1959 N. A. F. WILLIAMS 2,875,336

ELECTRONIC SIGNAL DELAY CIRCUITS

Filed July 19, 1956 2 Sheets-Sheet 1

INVENTOR
NIGEL ARTHUR FREDERICK WILLIAMS
BY Kane and Nydick
ATTORNEYS

Feb. 24, 1959 N. A. F. WILLIAMS 2,875,336

ELECTRONIC SIGNAL DELAY CIRCUITS

Filed July 19, 1956 2 Sheets-Sheet 2

INVENTOR
NIGEL ARTHUR FREDERICK WILLIAMS
BY Hane and Nydick
ATTORNEYS

United States Patent Office 2,875,336

Patented Feb. 24, 1959

2,875,336

ELECTRONIC SIGNAL DELAY CIRCUITS

Nigel Arthur Frederick Williams, Stevenage, England, assignor to The British Tabulating Machine Company Limited, London, England, a British company Application July 19, 1956, Serial No. 598,930

Claims priority, application Great Britain August 25, 1955

8 Claims. (Cl. 250—27)

The invention relates to electrical pulse circuits and is particularly concerned with pulse producing and pulse generating circuits.

In an electronic computer, it is desirable that for reliable operation electrical pulses representing data, or for control purposes, should be of a standard shape and accurately timed with respect to other pulses. However, when pulses are used to operate computer elements, such as gates, the shape of the resulting output pulse is distorted and owing to the finite time of operation of the elements, out of synchronism with other sets of pulses, such as timing pulses. This deterioration in shape and timing becomes particularly noticeable when computer elements are cascaded, the output pulse from one element being used to operate the next. When this deterioration becomes too great to ensure reliable operation of the elements, it is necessary to reshape the distorted pulses and to retime them with respect to timing pulses. Since it is not possible to advance the distorted pulses in time, each distorted pulse controls the generation of a pulse which is effectively delayed, so that this pulse is coincident with the timing pulse next following that which was coincident with the original distorted pulse.

Thus, the circuit which reshapes and retimes distorted pulses provides a pre-determined delay. A number of such circuits may be connected in cascade, the pulse reshaping function ensuring that a pulse applied to the first circuit does not deteriorate in shape as it is effectively propagated along the cascaded circuits, each circuit contributing a pre-determined delay. Such a chain of circuits is particularly suitable for generating a train of accurately shaped and timed pulses, in response to an input pulse.

It is an object of the present invention to provide pulse reshaping and retiming means.

It is a further object to provide pulse train generating arrangements utilising such pulse reshaping and retiming means.

According to the invention an electronic pulse delay apparatus comprises a source of timing pulses, means for controlling the application of pulses from said source to the input of a pulse generator which is adapted to generate a further pulse, the leading edge of which is substantially coincident with the trailing edge of the applied pulse, and delay means arranged to receive said further pulse and to lengthen it to a pre-determined extent. The application of a timing pulse may be controlled by a pulse to be reformed.

The invention will now be described, by way of example, with reference to the accompanying drawings, in which.

Figure 2:
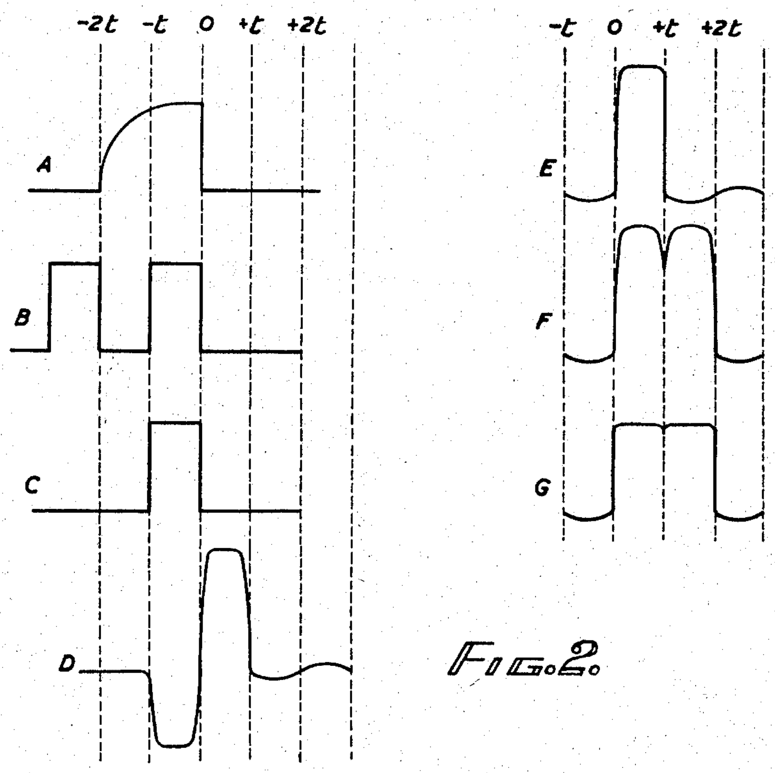
Figure 2 shows approximate waveforms at selected points in the circuit of Figure 1.

Owing to the time constants of electronic circuits, computer elements, such as gates, which are operated by a square pulse, produce an output pulse which shows a deterioration in shape and lengthening of duration. The leading edge of the pulse becomes curved, as shown in Figure 2A. The trailing edge may also become distorted but in general the latter half of the pulse has greater amplitude than the first half. Accordingly, the latter half of the pulse is used to operate the circuit to be described.

Figure 1:
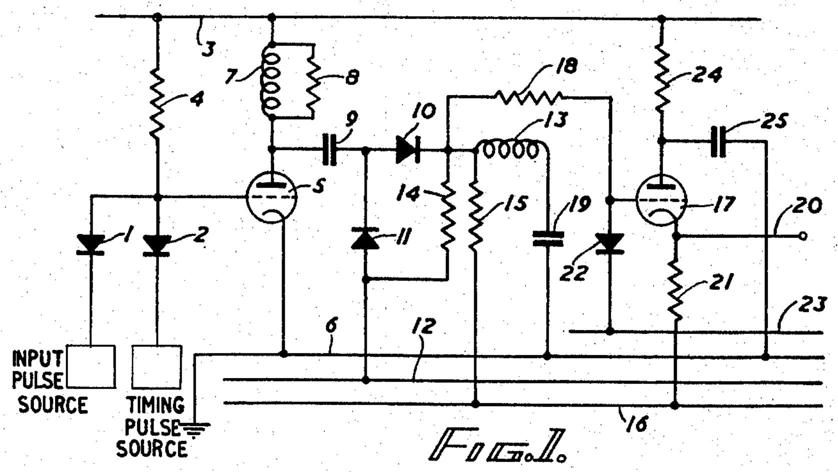
Figure 1 is a circuit diagram of a pulse delay and reforming circuit.

Pulse timing is determined with respect to positive timing or clock pulses, shown in Figure 2B, having a square waveform of prescribed length $t$, such as ½ microsecond, and a separation of $2t$. Such a waveform, with unity mark/space ratio, is desirable as it imposes less stringent frequency response requirements than any other mark/space ratio waveform. The pulse to be reshaped has a nominal length of $2t$, and the circuit shown in Figure 1 is designed to produce a reformed positive pulse of duration $2t$, the leading and trailing edges of the pulse to coincide with the trailing edges of consecutive timing pulses. The timing of the reshaped pulse is thus determined by the accurate timing pulse and not by the distorted pulse, the edges of which may have become ill-defined.

Turning now to Figure 1, a positive distorted pulse to be reshaped, as shown in Figure 2A, is applied to the cathode of a diode 1 and positive timing pulses, as shown in Figure 2B, are applied to the cathode of a diode 2. The anodes of the diodes are connected to the grid of a triode 5 and also through a resistor 4 to a 150 volt positive supply line 3. All voltages are referred to an earth line 6. The nominal termination of each distorted pulse coincides with the trailing edge of a timing pulse. By "nominal termination" is meant the end of the pulse had there been no distortion.

In the absence of input pulses, the voltages at the cathodes of the diodes 1, 2 are sufficiently low to keep the grid of triode 5 below cut-off value. When a pulse is applied to one diode only, the other serves to keep triode 5 cut-off. When the pulses applied to both diodes coincide, and this can only occur during the latter half of the distorted pulse, the cathode voltage of both diodes rises causing the grid voltage of triode 5 to rise above cut-off value so that triode 5 conducts. Diodes 1, 2 thus act as a gate to cause a timing pulse, as shown in Figure 2C, to pass to the grid of triode 5 when, and only when, there is simultaneously applied to the gate a pulse to be reshaped. The cathode of triode 5 is connected to the earth line 6 and the anode is connected through an inductor 7 to the supply line 3. A resistor 8 is connected across the inductor 7. The inductor and resistor form, with the self capacitance of the inductor 7, a heavily damped "ringing" circuit with a period of $2t$.

When a timing pulse is applied to the grid of triode 5, the latter conducts heavily and the anode voltage falls, but rises again as soon as the valve is cut-off at the end of the pulse. Owing to the presence of the ringing circuit 7, 8 the anode voltage continues to rise and does not return to its normal value until a time $t$ after the valve was cut-off. Owing to the heavy damping effect of the resistor 8, any further changes in anode voltage are small in comparison and will be neglected in the description that follows. The output from the anode of triode 5 thus consists of a negative pulse of duration $t$ followed by a positive pulse of equal duration, as shown in Figure 2D.

The output is taken, via a coupling capacitor 9, to the anode of a diode 10 and the cathode of a diode 11. The anode of the diode 11 is connected to a −20 volt line 12 and serves to clamp the D. C. level of this part of the circuit. The diode 11 also serves to prevent the output pulse from the capacitor 9 from falling appreciably below this level; hence the negative pulse is almost eliminated and the pulse transmitted to diode 10 has the form shown in Figure 2E. Thus, the triode 5 and the associated circuit act as a pulse generator to produce pulses of fixed duration, the leading edge of which coincides with the trailing edge of the timing pulse.

The cathode of the diode 10 is connected to the line 12 via a resistor 14, to a −75 volt line 16 via a resistor 15, to the grid of a triode 17 via a resistor 18 and to a delay line which consists of a capacitor 19 and an inductance 13. The delay line is terminated by an open circuit which provides a mis-matched reflective termination to the line, causing the positive pulse from the anode of tube 5 to be reflected and added to the originating pulse. The constants of the delay line are such that the pulse is delayed by a time *t*, consequently, the leading edge of the reflected pulse coincides with the trailing edge of the originating pulse, to form, as shown in Figure 2F, a single pulse of duration 2*t* initiated by the trailing edge of the timing pulse. Figure 2G shows the pulse waveform of the pulse applied to the grid of triode 17.

Rectifier 11 not only prevents the possibility of interaction between the successive reformed pulses by eliminating the negative pulse produced by the ringing circuit which otherwise might interact with the reflected part of the preceding pulse, but also provides a high impedance for the reflective pulse in place of the comparatively low effective anode impedance of valve 5.

The triode 17 acts as a cathode follower, the reshaped output pulse, which is similar to the waveform Figure 2G, being taken from the cathode on a line 20. A cathode load resistor 21 is connected to the line 16. A resistor 24 and a capacitor 25 serve as anode de-coupling components. The grid of the valve 17, as well as being connected to the resistor 18, is also connected to the anode of a diode 22, the cathode of which is maintained at +15 volts by a line 23. This serves to limit the amplitude of the positive pulse applied to the grid of the valve and has the effect of clipping the top of the pulse to provide a square waveform.

The circuit shown in the drawing thus generates a retimed and reshaped pulse having the same length as the nominal length of the input pulse, the leading edge of the reshaped pulse coinciding with the trailing edge of the timing pulse; a delay of 2*t* thus occurs between the receipt of the input pulse and the appearance of the re-shaped pulse from the circuit.

In one constructional example in which the timing pulse length was ½ microsecond, the components of the circuit of Figure 1 had the following values.

*Resistors*

| | Ohms |
|---|---|
| **4** | 100,000 |
| **8** | 4,700 |
| **14** | 27,000 |
| **15** | 68,000 |
| **16** | 3,900 |
| **21** | 6,800 |
| **24** | 1,000 |

*Capacitors*

| | | |
|---|---|---|
| **9** | micro-microfarads | 100 |
| **19** | do | 20 |
| **25** | microfarads | 0.01 |

*Inductors*

| | Microhenries |
|---|---|
| **7** | 500 |
| **13** | 700 |

Valves 5 and 17 were two halves of a valve type 12BH7 and diodes 1, 2, 10, 11, 22 were germanium diodes.

The duration of the reformed pulse is determined by the constants of the ringing circuit in the anode of the triode 5, and the delay line formed by the inductor 13 and the capacitor 19. One such pulse is produced for each pulse applied to the grid of the triode 5, so that there may be either a fixed or variable separation between the applied pulses, where the applied pulses are produced by a gate, such as the coincidence gate formed by the diodes 1 and 2, there must clearly be a timed relationship between the input and timing pulses, that is, a timing pulse must occur at every interval at which an input pulse might occur.

Figure 3:
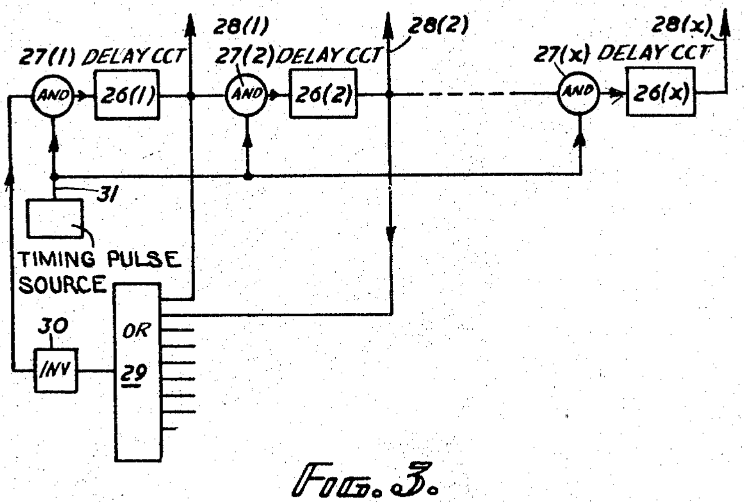
Figure 3 is a schematic diagram of a pulse distributing apparatus employing the circuit of Figure 1.

The circuit of Figure 1 may conveniently be employed in an arrangement for distributing a succession of pulses sequentially to a plurality of output points each of which will serve as a source of master timing pulses in a synchronous computer, for example. Such an arrangement is illustrated in Figure 3 in which each block 26 and 27 together represent a circuit such as that of Figure 1.

Each circuit 26 has an input gate 27(1), 27(2) . . . 27(X), equivalent to the diodes 1, 2 of Figure 1, and has an output line 28(1) . . . 28(X) by which master timing pulses are supplied to various points in the computer (not shown). The output of each circuit 26, except the final one, is also connected to the input of an Or gate 29, the output of which is connected through an inverter 30 to control the input gate 27(1). The Or gate is of known form in which a plurality of diodes are so interconnected that operation of any input line produces an output.

In operation timing pulses are applied in common over line 31 to all the gates 27, of which gate 27(1) is held open by the inverter 30, in the absence of an output from the Or gate 29, and the remaining gates are closed. The first clock pulse on line 31 thus passes through gate 27(1), and produces an output on line 28(1) which is delayed with respect to the input clock pulse by substantially one clock pulse period. This delayed output operates the Or gate 29 to produce an output which, acting through inverter 30, serves to close gate 27(1) to the second clock pulse. The delayed output also serves to open gate 27(2) to the second clock pulse, so that the cycle is repeated for the second circuit 26, and so on until the Xth clock pulse passes through gate 27(X) to produce an output pulse on line 28(X).

There is now however no input to the Or gate 29, to close gate 27(1) at the time of the next clock pulse, so that the next $(X+1)$th clock pulse is applied through gate 27(1) to the first circuit in the arrangement. In this way a pulse is delivered to each of the output lines 28 once every X clock pulses.

These master timing impulses can be applied to control a similar arrangement to that of Figure 3 serving to produce trains of pulses at intervals spaced by a multiple of the duration of one such train. Such an arrangement may be employed, for example, to produce a word-length block of pulses once every Y word times, in a computer control unit.

Figure 4:
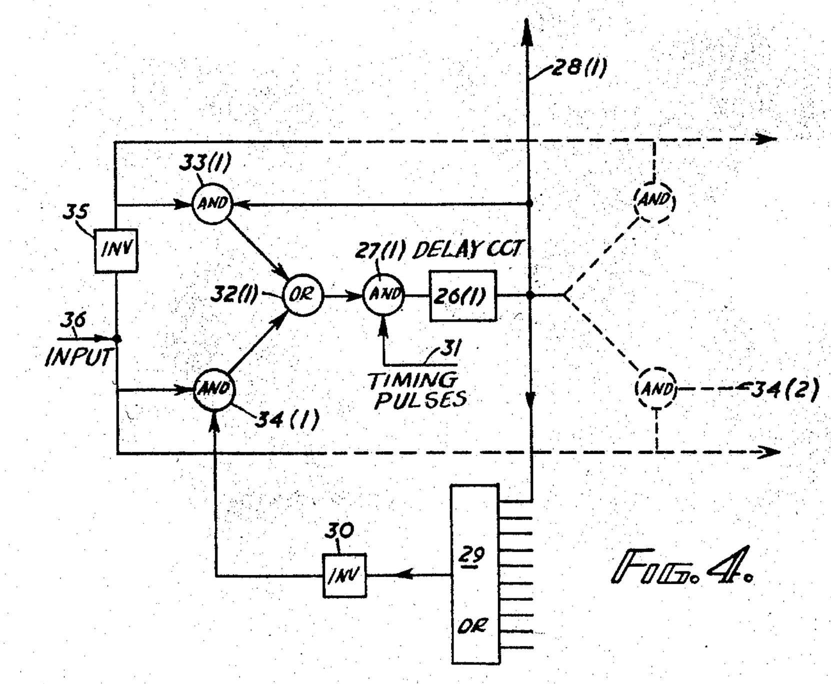
Figure 4 is a schematic diagram of a pulse train distributing apparatus employing the circuit of Figure 1.

Figure 4 shows schematically one stage of such an arrangement, the block 26 once again denoting a circuit of the type shown in Figure 1, and the same references as for Figure 3 being used to denote the same circuit components. The input gate circuit 27(1) is, in this arrangement, controlled by an Or gate 32(1) which in turn receives the outputs of two further gates 33(1) and 34(1). Gate 33(1) is controlled by each master timing pulse received through an inverter 35 from the input line 36 to the arrangement, and by the outlet of its associated circuit 26. Gate 34(1) is controlled by the master timing pulses on line 36 and also, through inverter 30, by the output of Or gate 29 which receives the outputs of all the circuits 26, except the last one, 26(Y) (not shown). The gate 27(1) receives clock pulses over line 31, and when the first master timing pulse is applied to gates 33(1) and 34(1), the latter applies an output to the Or gate 32(1), which operates to open gate 27(1), and allow a clock pulse into circuit 26. The output of circuit 26 passes through gate 33(1)

and Or gate 32(1) thus allows the next clock pulse through gate 27(1), the cycle repeating for each clock pulse until the next master timing pulse appears on line 36. The output of circuit 26 also acts, in the same manner as described in connection with Figure 3, to open gate 34(2) and, through Or gate 29 and inverter 30, to close gate 34(1).

The second master timing pulse closes gate 33(1) and passes through gate 34(2) so that the next circuit 26 (not shown) of the arrangement receives clock pulses in the same manner as the circuit just described. The output pulse from the last clock pulse to enter the first stage via gate 34(1) cannot pass through gate 33(1) so that the regenerative cycle for this stage is broken and, due to the output of Or gate 29, further master timing pulses are ineffective on this stage until the last or Yth stage has delivered its block of output pulses.

Thus on the output line such as 28(1) of each stage there appears a group of pulses once every Y master timing pulses.

What I claim is:

1. Electronic pulse delay and reforming apparatus comprising a source of timing pulses, each of which has a length half the length of the pulses to be reformed and the trailing edges of which are substantially coincident with the trailing edges of the pulses to be reformed, gating means to which said timing pulses and said pulses to be reformed are applied and which passes a timing pulse, if coincident with one of said pulses to be reformed, a ringing circuit operatively connected to the output of said gating means, means for eliminating substantially all oscillations from said circuit except that succeeding the termination of the pulse passed by said gating means, and a reflective delay line having a transit time equal to half the length of a timing pulse connected to said circuit to double the length of the pulse from said circuit.

2. Electronic pulse delay and reforming apparatus comprising a source of timing pulses, each of which has a length half the length of the pulses to be reformed and the trailing edges of which are substantially coincident with the trailing edges of the pulses to be reformed, gating means to which said timing pulses and said pulses to be reformed are applied and which passes a timing pulse if coincident with one of said pulses to be reformed, a ringing circuit operatively connected to the output of said gating means, a unilaterally conducting device connected to said ringing circuit to remove the first oscillation of said circuit but to retain the pulse emitted by said circuit at the end of the timing pulse applied to said circuit, and a reflective delay line having a transit time of half the length of a timing pulse operatively connected to said ringing circuit, to double the pulse emitted thereby.

3. Electronic pulse distributing apparatus comprising a plurality of delay means, each said delay means comprising a generator for generating a further pulse on the application of a pulse to said generator, the leading edge of said further pulse being substantially coincident with the trailing edge of said applied pulse, and pulse lengthening means operatively connected to the output of said generator; a source of timing pulses; means connecting said delay means as a chain of stages; means for applying the timing pulses from said source to said delay means; control means operated by the pulse outputs of each said delay means except the last of said chain and controlling said applying means for causing a timing pulse to be applied to the next succeeding delay means; and means controlled by the pulse output of all said delay means, except the last in said chain, for preventing the application of a timing pulse to the first of said delay means in said chain, whereby successive timing pulses produce pulse outputs at successive delay means.

4. Electronic pulse distributing apparatus comprising a plurality of delay means, each said delay means comprising a generator for generating a further pulse on the application of a pulse to said generator, the leading edge of said further pulse being substantially coincident with the trailing edge of said applied pulse, and pulse lengthening means operatively connected to the output of said generator; for each said delay means a gate which has a first pulse input and a second pulse input and which emits a pulse only on the simultaneous application of pulses to the said first and second inputs, the output of said gate being connected to the input of its delay means; means connecting said delay means and gates in a chain with the output of each delay means operatively connected to said one pulse input of the next gate; a source of timing pulses connected to said second pulse input of all said gates; and gating means controlled by the output from all said delay means except the last in said chain and operatively connected to said first pulse input of the first gate in said chain to prevent passage of a timing pulse to the first delay means in said chain while there is an output from any of said delay means except the last in said chain; whereby successive timing pulses produce outputs at successive delay means.

5. Electronic pulse distributing apparatus comprising a plurality of delay means, each said delay means comprising a ringing circuit, means for eliminating substantially all oscillations from said circuit except that succeeding the termination of a pulse applied to said circuit, and a reflective delay line connected to said ringing circuit for doubling the length of the pulse from said ringing circuit; for each said delay means a gate which has a first pulse input and a second pulse input and which emits a pulse only on the simultaneous application of pulses to the said first and second inputs, the output of said gate being connected to the input of its delay means; means connecting said delay means and gates in a chain with the output of each delay means operatively connected to said one pulse input of the next gate; a source of timing pulses connected to said second pulse input of all said gates; and gating means controlled by the output from all said delay means except the last in said chain and operatively connected to said first pulse input of the first gate in said chain to prevent passage of a timing pulse to the first delay means in said chain while there is an output from any of said delay means except the last in said chain; whereby successive timing pulses produce outputs at successive delay means.

6. Electronic pulse distributing apparatus comprising a plurality of delay means, each said delay means comprising a generator for generating a further pulse on the application of a pulse to said generator, the leading edge of said further pulse being substantially coincident with the trailing edge of said applied pulse, and pulse lengthening means operatively connected to the output of said generator, input gating means for each said delay means, said gating means being connected to the input of its delay means; each said delay means and gating means forming a part of one of a chain of stages; further gating means controlling the application of pulses to the first stage, means for applying the output pulse of each said stage to said input gating means of the same stage and also, except in the case of the last stage, to the input gating means of the next succeeding stage, a source of master timing signals for determining the duration of the pulse trains distributed by the apparatus, means for applying the master timing pulses to said input gating means of all the stages, and means responsive to the output pulses of all but the last one of said stages to control the input gating means of the first stage, the input gating means of each stage being operative to produce an output pulse in response to the application of a master timing pulse at a time when there is no output from the next preceding stage or, in the case of the first stage, from any of the succeeding stages, and also in response to the application of an output pulse from the stage with which it is associated at a time when there is no master timing pulse applied thereto.

7. Apparatus as claimed in claim 6 in which the input gating means of each stage comprises a first gate to which are applied master timing pulses and output pulses of the stage with which it is associated, a second gate to which are applied master timing pulses and, in the case of the first stage, the output pulses of the succeeding stages or, in the case of any other stage, the output pulses of the next preceding stage, a third gate operated by output pulses from either the first gate or the second gate and a fourth gate controlled by said third gate and controlling the passage of timing pulses to said delay means of said stage.

8. Apparatus as claimed in claim 7 in which the first and second gates are operative in opposite senses in response to the master timing pulses.

References Cited in the file of this patent

UNITED STATES PATENTS

| | | |
|---|---|---|
| 2,495,780 | Shepard et al. | Jan. 31, 1950 |
| 2,617,883 | Anger | Nov. 11, 1952 |
| 2,748,270 | Eckert et al. | May 29, 1956 |
| 2,750,499 | Newman et al. | June 12, 1956 |